US008799824B1

(12) United States Patent
Chien

(10) Patent No.: US 8,799,824 B1
(45) Date of Patent: Aug. 5, 2014

(54) SYSTEMS AND METHODS FOR HANDLING POP-UP MESSAGES

(75) Inventor: Hao-Liang Chien, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1985 days.

(21) Appl. No.: 11/862,141

(22) Filed: Sep. 26, 2007

(51) Int. Cl.
| | |
|---|---|
| *G06F 3/00* | (2006.01) |
| *G06F 3/048* | (2013.01) |
| *G06F 3/033* | (2013.01) |
| *G06F 3/01* | (2006.01) |
| *G06F 11/34* | (2006.01) |
| *G06F 3/0488* | (2013.01) |

(52) U.S. Cl.
CPC .............. *G06F 3/017* (2013.01); *G06F 3/0488* (2013.01); *G06F 11/34* (2013.01)
USPC ........... 715/863; 715/862; 715/825; 715/808; 715/764

(58) Field of Classification Search
CPC ........ G06F 3/017; G06F 3/0488; G06F 11/34
USPC .......................... 715/863, 862, 825, 808, 764
See application file for complete search history.

(56) References Cited

U.S. PATENT DOCUMENTS

| 6,518,983 B1* | 2/2003 | Grohmann et al. ............ 715/781 |
| 7,500,145 B2* | 3/2009 | Wright et al. .................... 714/26 |
| 2007/0118638 A1* | 5/2007 | Ban et al. ...................... 709/224 |

* cited by examiner

*Primary Examiner* — Boris Pesin
*Assistant Examiner* — Sabrina Greene
(74) *Attorney, Agent, or Firm* — IPSG, P.C. Intellectual Property Law

(57) ABSTRACT

The invention relates, in an embodiment, to a system for handling one or more pop-up messages activated by one or more applications and displayed on an output device associated with an electronic device, the electronic device is associated with an input device is provided. The system for handling pop-up messages includes an identification module to identify an active pop-message activated by an application of one or more applications. The system for handling pop-up messages also includes a recording control module to record a movement path associated with the input device. The system for handling pop-up messages also includes a translation module configured to translate recorded data pertaining to the movement path into a command pertaining to the active pop-up message.

20 Claims, 6 Drawing Sheets

SYSTEMS AND METHODS FOR HANDLING POP-UP MESSAGES

BACKGROUND OF THE INVENTION

A pop-up message/window typically represents a message/window that is activated by an application upon some event or condition. The application may be, for example, an antivirus application or an advertisement application. The electronic device may represent, for example, a computer or a smart phone. The pop-up message/window may be displayed on an output device (e.g., a display) associated with the electronic device to, fore example, request the user of the electronic device to provide a response/command by clicking a button shown along with the pop-up message. In general, unwanted pop-up messages/windows may cause significant distraction and even interruption to users of electronic devices, as discussed with reference to FIG. 1.

FIG. 1 illustrates a schematic representation of an example prior art scheme for handling pop-up messages/windows. In the example of FIG. 1, a window 100 may be associated with a task that a user is performing. When pop-up messages/windows 102 and 152 are activated by one or more applications to request responses/commands from the user, a portion of window 100 may be covered by pop-up messages/windows 102 and 152. Given that window 100 is partially covered by pop-up messages/windows 102 and 152, the user may be distracted, and the task may be interrupted.

Pop-up message/window 102 and pop-up message/window 152 may be presented along with buttons 104-112 and buttons 154-162, respectively, for receiving commands from the user. In order to respond to pop-up messages/windows 102 and 152 with an intended command, the user may need to identify a button among the ten buttons 104-112 and 154-162 that is associated with the intended command. The user may also need to move a pointer 114 (associated with an input device, e.g., a mouse) from a position in window 100, for approximately a long distance 116 or 118, to the identified button, to click on the identified button. After clicking on the identified button, the user may also need to move pointer 114 back, for approximately distance 116 or 118, for resuming the task.

According to the prior art scheme, in handling pop-up messages, the user may need to identify an intended button from a great number of buttons. Further, the user may need to spend a significant amount of time operating the input device, to click on the intended button and to resume the task. As a result, the user may be significantly distracted from the task at hand, and the task may be substantially interrupted.

SUMMARY OF INVENTION

The invention relates, in an embodiment, to a system for handling one or more pop-up messages activated by one or more applications and displayed on an output device associated with an electronic device, the electronic device is associated with an input device. The system for handling pop-up messages includes an identification module to identify an active pop-message activated by an application of one or more applications. The system for handling pop-up messages also includes a recording control module to record a movement path associated with the input device. The system for handling pop-up messages also includes a translation module configured to translate recorded data pertaining to the movement path into a command pertaining to the active pop-up message.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
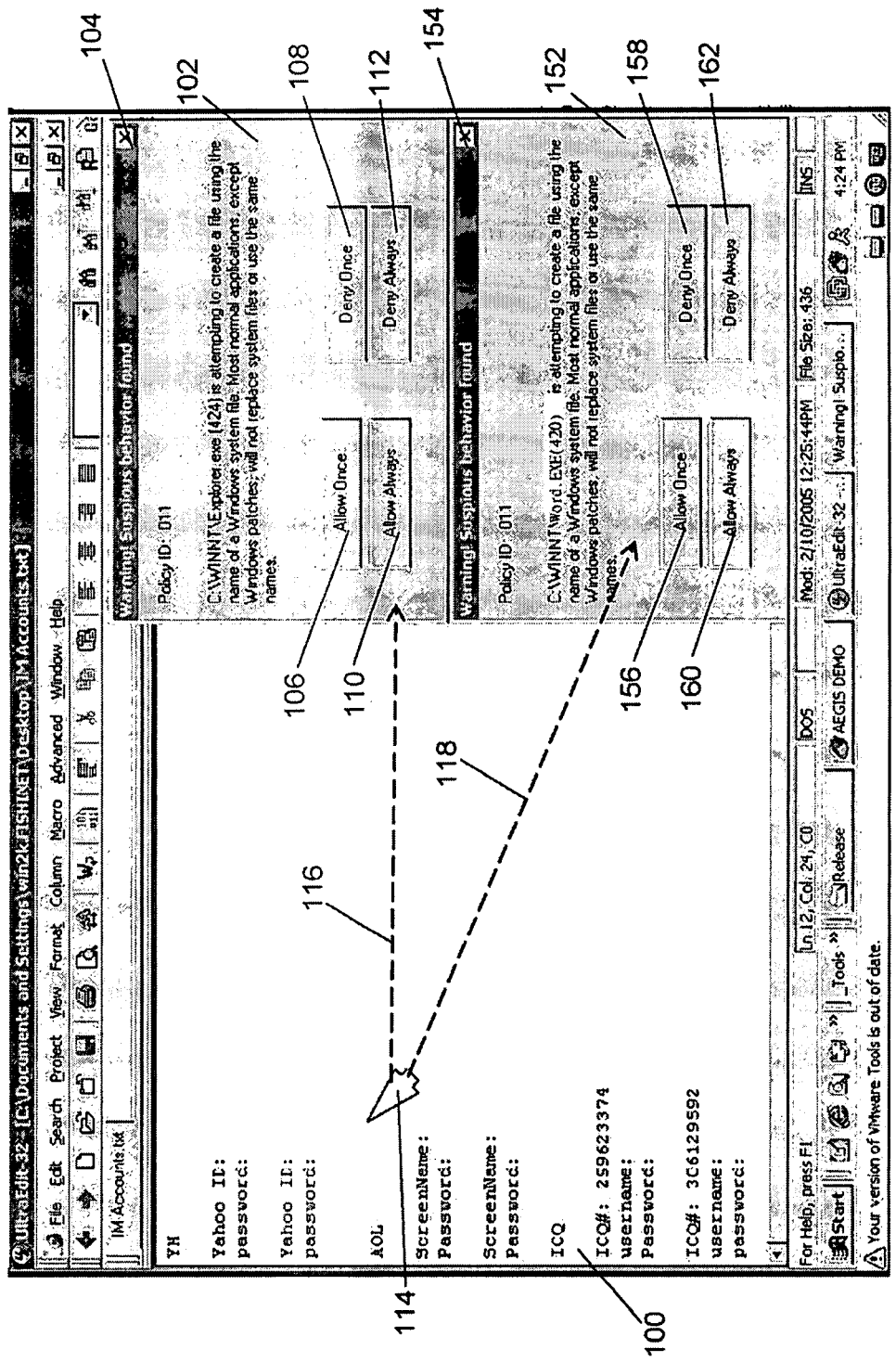
FIG. 1 illustrates a schematic representation of an example prior art scheme for handling pop-up messages/windows.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well-known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated electronic device when appropriately programmed and may include a combination of a computer/electronic device and dedicated/programmable circuits adapted for the various tasks pertaining to embodiments of the invention.

One or more embodiments of the present invention relate to a system for handling one or more pop-up messages/windows displayed on an output device (e.g., a display or a speaker) associated with an electronic device. For example, the electronic device may represent a computer, a personal digital assistant (PDA), or a smart phone. The electronic device may also be associated with an input device, e.g., a mouse, a trackball, or a touchpad. The one or more pop-up messages may be activated and/or provided by one or more applications. Typically, the one or more pop-up messages are not directly triggered by a user of the electronic device. For example, an antivirus application may activate a pop-up message to inform the user of the electronic device that a suspicious program is detected in the electronic device and to request a response/command from the user. As another example, an advertisement application may activate a pop-up message asking the user to access a website by clicking on a button.

The system may include an identification module configured to select an active pop-up message/window from a plurality of pop-up messages/windows. The active pop-up message may be activated by one of a plurality of applications.

The identification module may be configured to determine the active pop-up message based on activation times of the pop-up messages. The activation times may represent times when the pop-up messages are activated by the applications. In one or more embodiments, the active pop-up message may be a pop-up message that is provided earlier than any other pop-up message(s) that are present.

The system may also include a recording control module configured to control recording for a movement path associated with the input device. For example, the movement path may represent the path of some movement of a mouse, a finger on a touchpad, or a pointer associated with a mouse, touchpad, or trackball. Data pertaining to the movement path may be stored in a memory module of the electronic device.

The recording control module may be configured to activate the recording for the movement path if at least one button of the input device is operated (e.g., pressed or touched). The recording control module may also be configured to deactivate the recording for the movement path if the at least one button of the input device is not operated. In one or more embodiments, the at least one button may represent at least two buttons.

The system may also include a translation module configured to translate recorded data pertaining to the movement path (or movement path data) into a command pertaining to the active pop-up message. For example, the command may be associated with a button shown with the active pop-up message.

The system may also include an indication module configured to provide a visual indicator for the active pop-up message. For example, the visual indicator may include a conspicuous symbol, a highlighted icon, and/or a flashing sign. The visual indicator may be configured to differentiate the active pop-up message from any other pop-up message(s) in the plurality of pop-up messages, thereby indicating that the command is to be associated with the active pop-up message but not the other pop-up message(s).

The system may also include an association table configured to associate one or more movement path types with one or more pop-up message commands. For example, according to the association table, a movement path type characterized by a movement path that crosses itself once may be associated with a command "Deny."

In one or more embodiments, the translation module may be configured to monitor the movement path once (or after) the recording control module has activated the recording. The translation module may also be configured to start to translate the movement path into the command once (or after) the translation module has associated the movement path with a movement path type in the association table, without waiting for the recording to be deactivated. The recording may be deactivated once (or after) the translation has started.

One or more embodiments of the present invention relate to a method for handling one or more pop-up messages/windows. The one or more pop-up messages may be provided by one or more applications and displayed on an output device associated with an electronic device. The electronic device may also be associated with an input device.

The method may include determining an active pop-up message/window. The active pop-up message may be activated by an application of the one or more applications, which may represent a plurality of applications. The step of determining may be based on activation times of the one or more pop-up messages, i.e., times when the pop-up messages are activated by the applications. For example, the active pop-up message may be a pop-up message that is provided earlier than any other pop-up message(s) that are present.

The method may also include controlling recording for a movement path associated with the input device. The step of controlling may include activating the recording for the movement path if at least one button of the input device is operated. The step of controlling may also include deactivating the recording for the movement path if the at least one button or the input device is not operated. In one or more embodiments, the at least one button may represent at least two buttons.

The method may also include translating recorded data pertaining to the movement path into a command pertaining to the active pop-up message. The command may be associated with a button shown with the active pop-up message.

The method may also include providing a visual indicator for the active pop-up message. The visual indicator may be configured to differentiate the active pop-up message from any other message(s) that are present, thereby indicating that the command is to be associated with the active pop-up message but not the other message(s).

The method may also include associating one or more movement path types with one or more pop-up message commands.

In one or more embodiments, the method may also include monitoring the movement path after the recording has been activated. The method may also include starting to translate the movement path into the command once after the movement path has been associated with a movement path type in the association table, without waiting for the recording to be deactivated.

The features and advantages of the invention may be better understood with reference to the figures and discussions that follow.

Figure 2:
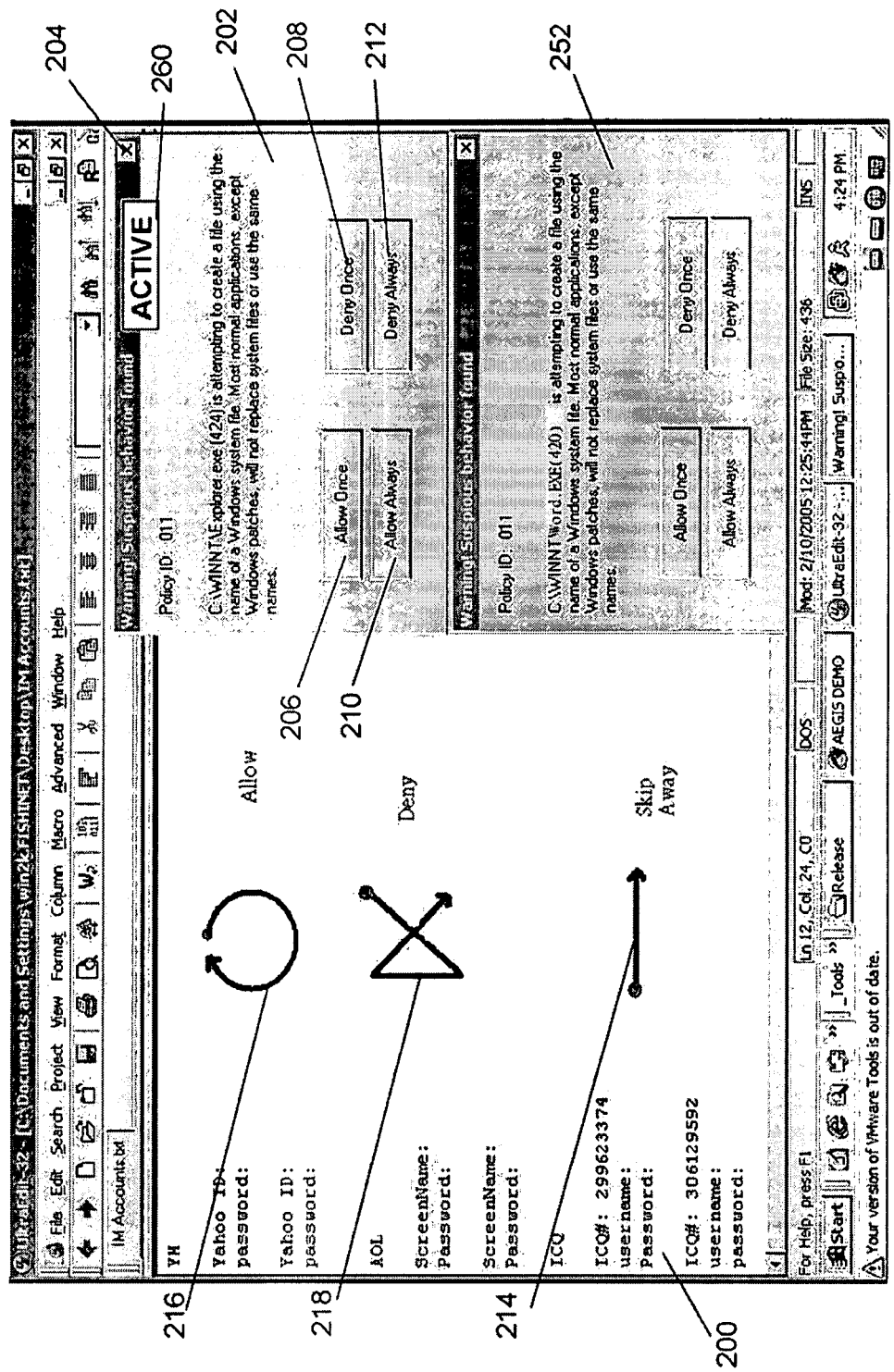
FIG. 2 illustrates a schematic representation of pointer movement paths associated with active pop-up window commands in accordance with one or more embodiments of the present invention.

FIG. 2 illustrates a schematic representation of an active pop-up message/window in accordance with one or more embodiments of the present invention. FIG. 2 also illustrates a schematic representation of pointer movement paths associated with active pop-up window commands in accordance with one or more embodiments of the present invention.

In the example of FIG. 2, a window 200 may be associated with a task that a user is performing. Pop-up messages/windows 202 and 252 may be activated by one or more applications requesting the user to provide one or more responses/commands. In one or more embodiments, one of the pop-up messages/windows, e.g., pop-up message/window 202, may be given a visual indicator 260 to indicate that pop-up message/window 202 is an active pop-up message/window. The active pop-up message/window, but not other pop-up messages/windows, is to be associated with a command provided by the user utilizing pointer movement when the active pop-up message/window is present. Accordingly, the user does not need to pay attention to pop-up message/window 252 when pop-up message/window 202 is present and marked with visual indicator 260. Advantageously, the number of pop-up messages/windows and buttons that the user has to attend to at the same time may be significantly reduced.

As further illustrated in the example of FIG. 2, various pointer movement path types may be associated with different buttons, e.g., buttons 204-212, shown along with active pop-up message/window 202. For example, movement path 216, which approximates a circle, may be associated with button 202, which is associated with a command "Allow Once." As another example, movement path 218, which crosses itself once, may be associated with button 208, which is associated with a command "Deny Once." As another example, movement path 214, which approximates a straight line, may be associated with button 204, which is associated with a command "Skip/Cancel."

Other movement path types may be associated with buttons 210-212. For example, a movement path type characterized by a spiral shape may be associated with button 210, which is associated with command "Allow Always." As another example, a movement path type characterized by a path that crosses itself two or more times may be associated with button 212, which is associated with a command "Deny Always."

In one or more embodiments, one or more of buttons 204-212 may not be associated with any movement path types. For example, buttons 210-212 may not be associated with any movement path types if buttons 210-212 are associated with commands that are relatively less frequently provided by the user. Accordingly, the number of movement path types that the user needs to be aware of may be reduced, and the process of handling pop-up messages/windows may be further simplified.

As can be appreciated from the example of FIG. 2, to provide a response/command to the active pop-up message/window, the user may only need to move the pointer (associated with the input device utilized by the user) about where the pointer is in window 200, which is associated with the task being performed by the user. The user may not need to move the pointer to any of the pop-up messages/windows. Advantageously, the distraction experienced by the user and the interruption to the task may be substantially reduced, compared with the distraction and the interruption associated with prior art schemes, such as the example prior art scheme illustrated in the example of FIG. 1.

Figure 3A:
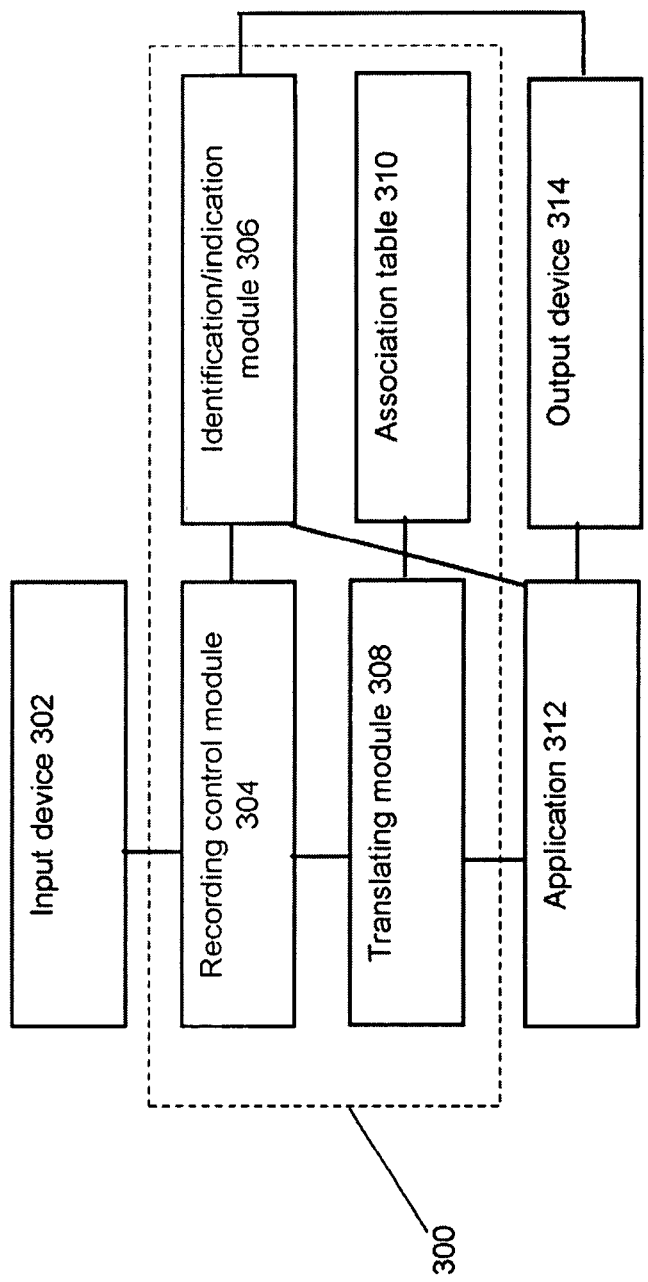
FIG. 3A illustrates a block diagram of a system for handling pop-up messages/windows in accordance with one or more embodiments of the present invention.

FIG. 3A illustrates a block diagram of a system 300 for handling pop-up messages/windows in accordance with one or more embodiments of the present invention. System 300 may include a set of computer programs configured to interact with an input device 302 (e.g., a mouse) associated with an electronic device (e.g., a computer, not shown). System 300 may also be configured to interact with one or more applications, e.g., an application 312, that have a presence in the electronic device. In one or more embodiments, system 300 may also interact with an output device 314 associated with the electronic device. System 300 may include an identification/indication module 306, a recording control module 304, a translation module 308, and an association table 310.

Identification/indication module 306 (identification module 306) may be configured to detect one or more pop-up messages/windows activated by one or more applications, e.g., application 312. Identification module 306 may also be configured to determine an active pop-up message/window among multiple pop-up messages/windows. Identification module 306 may select the active pop-up message/window based on the activation times of the pop-up messages/windows. For example, the active pop-up message/window may represent the pop-up message/window with the earliest activation time among the pop-up messages/windows. As another example, the active pop-up message/window may be the pop-up message/window with the latest activation time among the pop-up messages/windows.

Identification module 306 (or a separate indication module) may be configured to provide a visual indicator for the active pop-up message/window. The visual indicator may enable a user of the electronic device to pay attention to only the active pop-up message/window without paying attention to other pop-up messages/windows at the same time. Accordingly, distraction for the user caused by the pop-up messages/windows may be minimized.

Recording control module 304 may be configured to control recording for a movement path (e.g., of a pointer) associated with input device 302. Recording control module 304 may activate the recording for the movement path when a button of input device 302 is operated (e.g., pressed or touched). Recording control module 304 may also be configured to deactivate the recording as soon as the button of input device 302 is not operated. Data pertaining to the movement path may be recorded in a memory module or storage device (not shown) associated with the electronic device.

In one or more embodiments, recording control module 304 may activate the recording when at least two buttons of input device 302 are operated, and may deactivate the recording when fewer than two buttons of input device 302 are operated.

Translation module 308 may be configured to translate recorded data pertaining to the movement path (or movement path data) into a command based on association table 310. The command may be associated with a button that is shown along with the active pop-up message/window.

In one or more embodiments, translation module 308 may be configured to monitor the movement path (or movement path data) once recording control module 304 has activated the recording. Translation module 308 may also be configured to start to translate the movement path into a command as soon as translation module 308 has associated the movement path with a movement path type in association table 310, without waiting for the recording to be deactivated. The recording may be deactivated once the translation has started.

Association table 310 may be configured to contain information pertaining to association between movement path types and pop-up message/window commands. Example schematic representations for association table 310 are illustrated in FIGS. 3B-C.

Figure 3B:
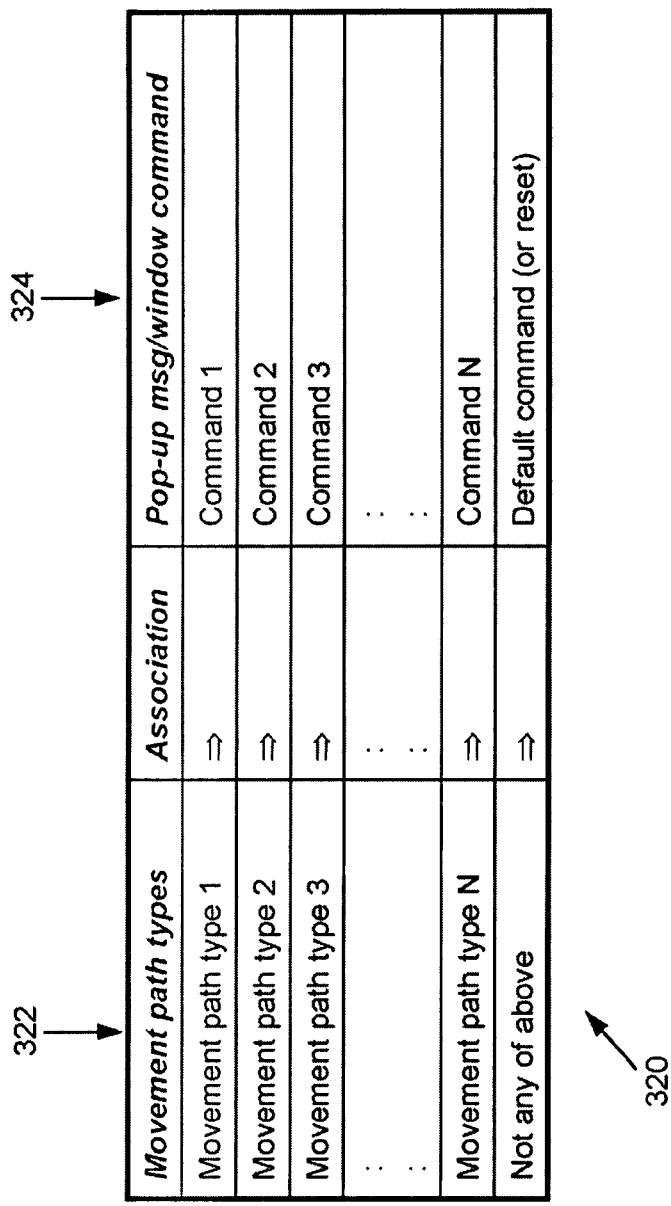
FIG. 3B illustrates an association table containing association information for movement path types and pop-up message/window commands in accordance with one or more embodiments of the present invention.

FIG. 3B illustrates an association table 320 containing association information for movement path types 322 and pop-up message/window commands 324 in accordance with one or more embodiments of the present invention. As illustrated in the example of FIG. 3B, movement path types 1-N are associated with commands 1-N, respectively. A movement path that is not associated with any of movement path types 1-N may be associated with a default command, such as command 1. In one or more embodiments, association table 320 may be configured such that a movement path not associated with any of movement path types 1-N may be associated with reset of the input device without being associated with any of commands 1-N.

Figure 3C:
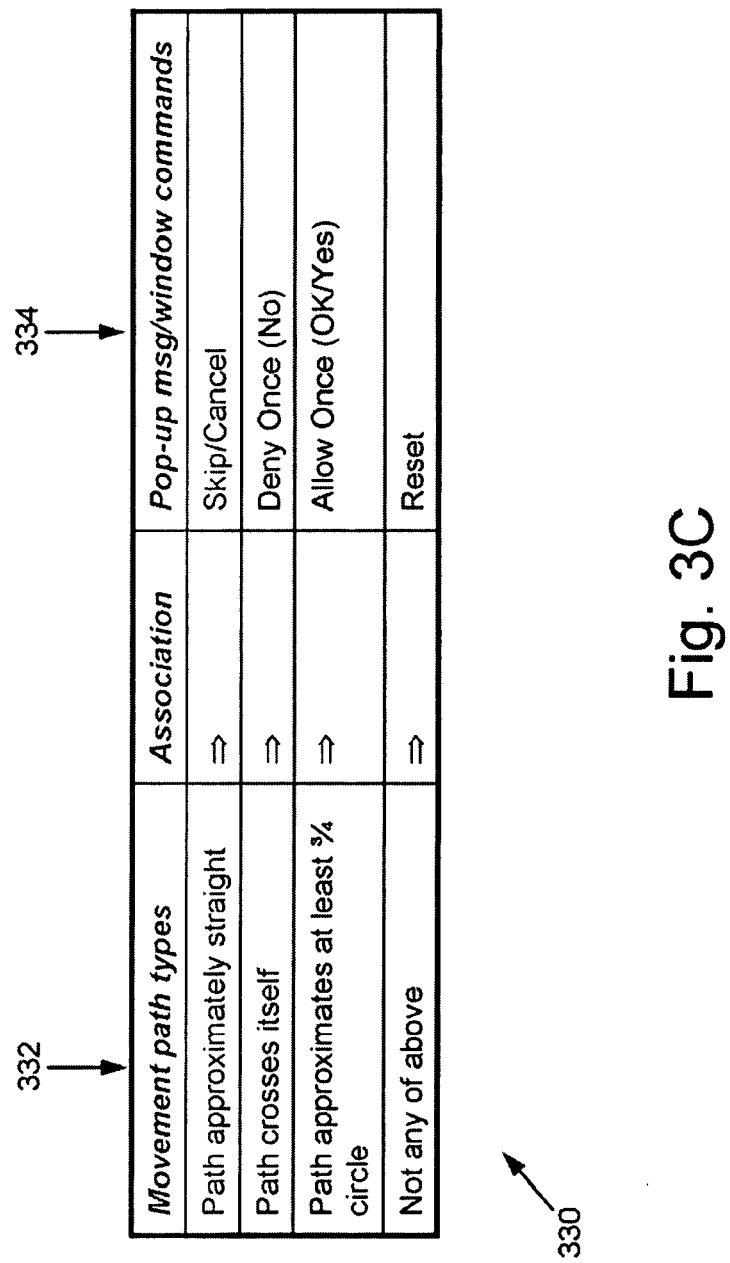
FIG. 3C illustrates an association table containing association information for movement path types and pop-up message/window commands in accordance with one or more embodiments of the present invention.

FIG. 3C illustrates an association table 330 containing association information for movement path types 332 and pop-up message/window commands 334 in accordance with one or more embodiments of the present invention. According to association table 330, a movement path that approximates a straight line may be associated with the command "Skip/Cancel." A movement path that crosses itself may be associated with the command "Deny Once." A movement path that approximates at least ¾ circle may be associated with the command "Allow Once." A movement path not associated with any of these three movement path types may be associated with reset of the input device and the memory for recording the movement path, without being associated with any of these three commands. Association table 330 may be utilized in implementing the scheme illustrated in the example of FIG. 2 for handling pop-up messages/windows.

Figure 4:
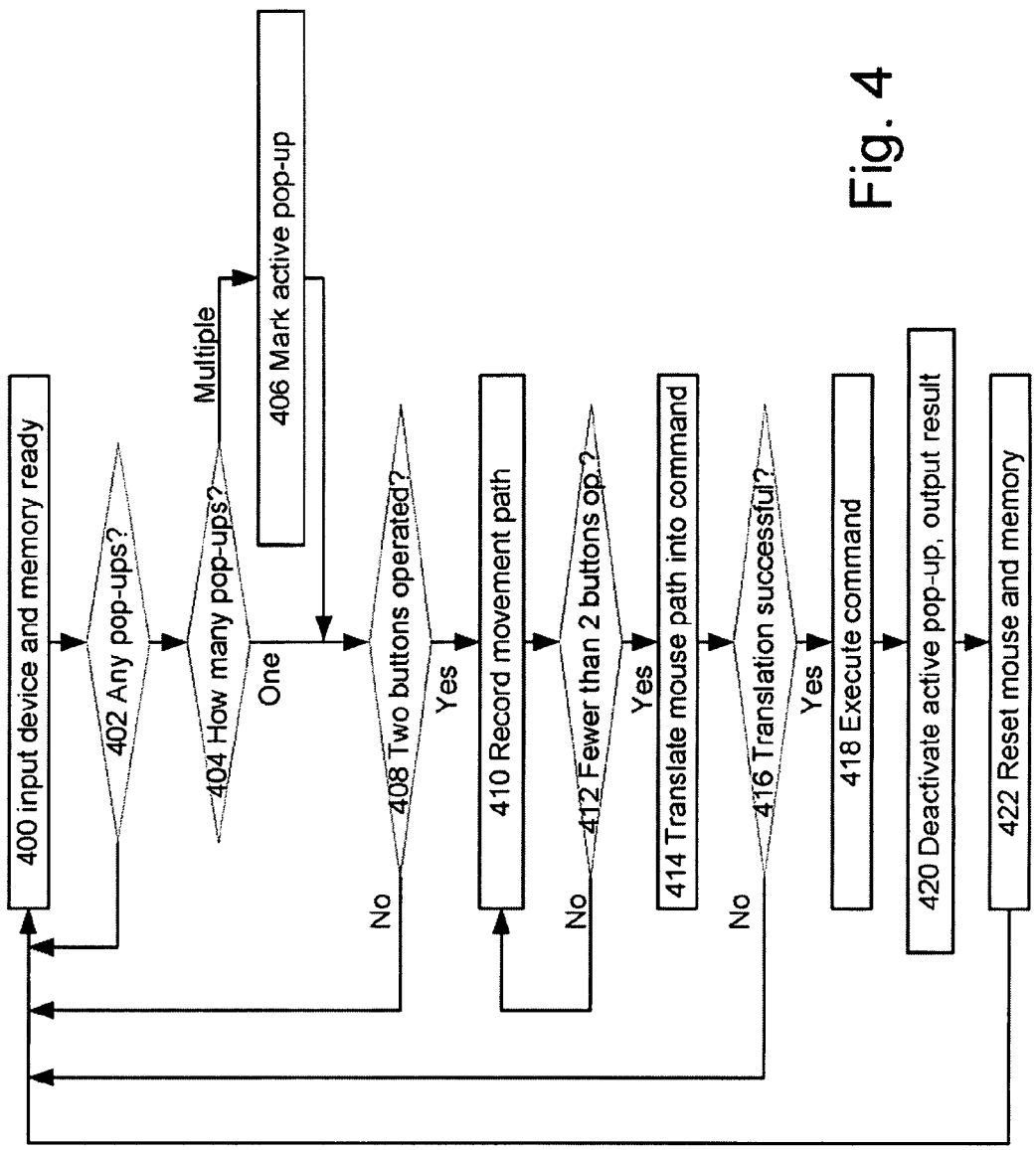
FIG. 4 illustrates a flowchart of a method for handling pop-up messages/windows in accordance with one or more embodiments of the present invention.

FIG. 4 illustrates a flowchart of a method for handling pop-up messages/windows in accordance with one or more embodiments of the present invention. The method may be implemented, for example, utilizing system 300 illustrated in the example of FIG. 3A. The method may start with step 400, in which input device 302 (shown in the example of FIG. 3A) and the memory module for storing movement path data may be in a ready state.

In step 402, identification module 306 (shown in the example of FIG. 3A) may determine whether one or more pop-up messages/windows have been activated by one or more applications, such as application 312 (shown in the example of FIG. 3A). If no pop-up message/window is present, control may be transferred back to step 400, in which input device 302 and the memory module may remain in the ready state. If one or more pop-up messages/windows are present, control may be transferred to step 404.

In step 404, identification module 306 may determine whether there is only one pop-up message/window or a plurality of pop-up messages/windows. If there is only one pop-up message/window, control may be transferred to 408. If there are multiple pop-up messages/windows, control may be transferred to step 406.

In step 406, identification module 306 may select an active pop-up message/window from the plurality of pop-up messages/windows. Identification module 306 may also mark the active pop-up message/window with a visual indicator.

In step 408, system 300 (or recording control module 304, shown in the example of FIG. 3A) may determine whether at least two buttons of input device 302 are operated. System 300 (or recording module 304) may be configured to receive signals from input device 302 when buttons of input device 302 are operated (e.g., pressed or touched) and released. If fewer than two buttons of input device 302 are operated, control may be transferred back to step 400. If at least two buttons of input device 302 are operated, control may be transferred to step 410.

In step 410, recording control module 304 may activate recording for the movement path associated with input device 302. Data pertaining to the movement path may be stored in the memory module.

In step 412, system 300 (or recording module 304) may determine whether the number of operated buttons have been reduced to below two. If the number of operated buttons is still two or more, control may be transferred back to step 410, in which the recording is continued. If the number of operated buttons is reduced to below two, control may be transferred to step 414.

In step 414, translation module 308 may try to translate the recorded movement path (or the recorded movement path data) into a command according to association table 310 (shown in the example of FIG. 3A).

In step 416, translation module 308 may determine whether the translation is successful, i.e., whether the recorded movement path is associated with a movement path type in association table 310. If the translation is not successful, control may be transferred back to step 400. If the translation is successful, i.e., the recorded movement path is associated with a movement path type, associated with a command, in association table 310, control may be transferred to step 418.

In step 418, the application, e.g., application 312, associated with the active pop-up message/window may execute the command resulted from the translation.

In step 420, the application may deactivate the active pop-up message/window such that the active pop-up message/window disappears. The application may also output a result, associated with the execution of the command, to output device 314 (shown in the example of FIG. 3A).

In step 422, system 300 may reset input device 302 to the ready state. System 300 may also reset the memory module for recording the next movement path for the next active pop-up message/window.

As can be appreciated from the foregoing, embodiments of the present invention may facilitate users of electronic devices to pay attention to only one pop-up message/window at a time, without requiring the users to pay attention to a great number of buttons associated with multiple pop-up messages/windows at the same time. Furthermore, embodiments of the invention may enable users of electronic devices to respond to pop-up messages/windows with minimum movement associated with input devices, without requiring the users to perform substantial input device movement for clicking on specific buttons and for resuming tasks. Advantageously, embodiments of the invention may substantially reduce distraction and task interruption caused by pop-up messages/windows.

While this invention has been described in terms of several embodiments, there are alterations, permutations, and equivalents, which fall within the scope of this invention. It should also be noted that there are many alternative ways of implementing the methods and apparatuses of the present invention. Additionally, it is intended that the abstract section, having a limit to the number of words that can be provided, be furnished for convenience to the reader and not to be construed as limiting of the claims herein. It is therefore intended that the following appended claims be interpreted as including all such alterations, permutations, and equivalents as fall within the true spirit and scope of the present invention.

What is claimed is:

1. A system for handling one or more pop-up messages, the one or more pop-up messages activated by one or more applications and displayed on an output device associated with an electronic device, the electronic device also associated with an input device, the system comprising:

an identification module configured to identify an active pop-up message, the active pop-up message activated by an application of the one or more applications;

a recording control module configured to control recording for at least a movement path associated with the input device;

a translation module configured to translate recorded data pertaining to at least the movement path into at least a command pertaining to the active pop-up message, the translation module being configured to translate first data into a first command, the translation module being configured to translate second data into a second command, the second command being different from the first command, the first data pertaining to a first movement path associated with the input device, the second data pertaining to a second movement path associated with the input device, the first movement path being characterized by a first geometric shape, the second movement path being characterized by a second geometric shape, the second geometric shape being different from the first geometric shape; and programmed circuits for performing one or more tasks associated with one or more of the identification module, the recording control module, and the translation module.

2. The system of claim 1 further comprising an indication module configured to provide a visual indicator for the active pop-up message, wherein the one or more pop-up messages represent a plurality of pop-up messages, the active pop-up message is one of the plurality of pop-up messages, and the visual indicator is configured to differentiate the active pop-up message from other pop-up messages in the plurality of pop-up messages, thereby determining that the command is to be associated with the active pop-up message.

3. The system of claim 1 wherein the command is associated with a button shown with the active pop-up message.

4. The system of claim 1 wherein the recording control module is configured to activate the recording for the movement path if at least one button of the input device is operated.

5. The system of claim 4 wherein the recording control module is configured to deactivate the recording for the movement path if the at least one button of the input device is not operated.

6. The system of claim 4 wherein the at least one button represents at least two buttons.

7. The system of claim 1 wherein the identification module is configured to identify the active pop-up message based on activation times of the one or more pop-up messages, the activation times of the one or more pop-up messages representing times when the one or more pop-up messages are activated by the one or more applications.

8. The system of claim 1 wherein the active pop-up message is a pop-up message that is provided earlier than any other pop-up message in the one or more pop-up messages.

9. The system of claim 1 further comprising an association table configured to associate one or more movement path types with one or more pop-up message commands.

10. The system of claim 9 wherein the translation module is configured to monitor the movement path after the recording control module has activated the recording, the translation module further configured to start to translate the movement path into the command after having associated the movement path with a movement path type of the one or more movement path types.

11. A method for handling one or more pop-up messages, the one or more pop-up messages activated by one or more applications and displayed on an output device associated with an electronic device, the electronic device also associated with an input device, the method comprising:

identifying an active pop-up message, the active pop-up message activated by an application of the one or more applications;

controlling recording for a movement path associated with the input device, the movement path being characterized by a geometric shape; and translating recorded data pertaining to the movement path into a command pertaining to the active pop-up message, the command being a first command if the geometric shape is a first geometric shape, the command being a second command if the geometric shape is a second geometric shape, the second command being different from the first command, the second geometric shape being different from the first geometric shape.

12. The method of claim 11 further comprising providing a visual indicator for the active pop-up message, wherein the one or more pop-up messages represent a plurality of pop-up messages, the active pop-up message is one of the plurality of pop-up messages, and the visual indicator is configured to differentiate the active pop-up message from other pop-up messages in the plurality of pop-up messages, thereby determining that the command is to be associated with the active pop-up message.

13. The method of claim 11 wherein the command is associated with a button shown with the active pop-up message.

14. The method of claim 11 wherein the controlling includes at least activating the recording for the movement path if at least one button of the input device is operated.

15. The method of claim 14 wherein the controlling further includes at least deactivating the recording for the movement path if the at least one button of the input device is not operated.

16. The method of claim 14 wherein the at least one button represents at least two buttons.

17. The method of claim 11 wherein the determining is based on activation times of the one or more pop-up messages, the activation times of the one or more pop-up messages representing times when the one or more pop-up messages are activated by the one or more applications.

18. The method of claim 11 wherein the active pop-up message is a pop-up message that is provided earlier than any other pop-up message in the one or more pop-up messages.

19. The method of claim 11 further comprising associating one or more movement path types with one or more pop-up message commands.

20. The method of claim 19 further comprising:

monitoring the movement path after the recording has been activated; and starting to translate the movement path into the command after the movement path has been associated with a movement path type of the one or more movement path types.

* * * * *